March 1, 1966     E. P. WOLLAN     3,237,530
FLUID POWER SYSTEM
Filed Oct. 21, 1963
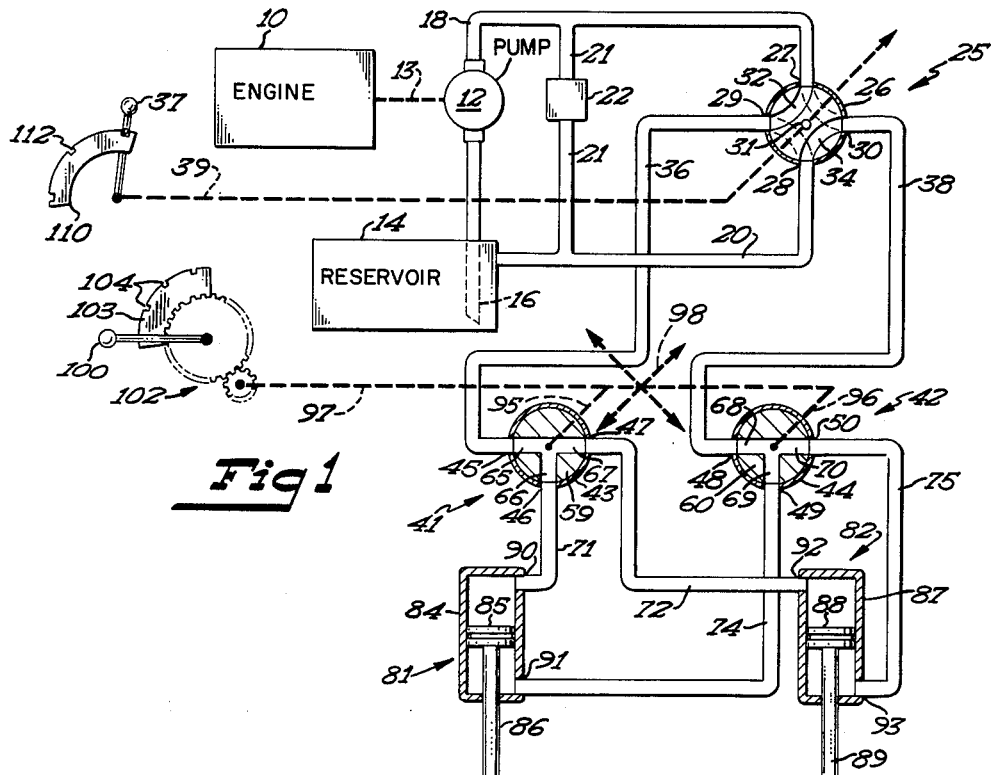
INVENTOR.
ERLING P. WOLLAN
BY
Schroeder & Siegfried
ATTORNEYS United States Patent Office 3,237,530
Patented Mar. 1, 1966

3,237,530
FLUID POWER SYSTEM
Erling P. Wollan, Fairdale, N. Dak.
Filed Oct. 21, 1963, Ser. No. 317,700
8 Claims. (Cl. 91—414)

This invention relates to fluid power systems and more particularly to an improved fluid or hydraulic power system adaptable for use with tractors and implements or similar devices.

Modern tractors, particularly farm tractors, have associated therewith, numerous implements requiring fluid or hydraulic power units for operating the same. The use of a single fluid or hydraulic power operator as an auxiliary power source for an implement becomes increasingly complex when additional power requirements are added thereto. This is particularly true in the power system of the tractor when it is required to operate two or more fluid operators which are required to be operated simultaneously and selectively.

The present invention is directed to an improved fluid or hydraulic power system with a simplified control apparatus for operating two hydraulic actuators from the power source of the tractor such that both actuators may be operated together and, at the will of the operator, one or the other of the actuators may be operated independently of the other or both actuators can be disconnected without interruption of the system in the event that this system is used for operation of some component of the tractor. An improved fluid or hydraulic circuit is provided with a simplified valving which includes two valve units that are identical in construction and connected together to be operated simultaneously. This control system operates through the normal reversing control of the tractor and will provide for directional control of the actuators as well as simultaneous and selective control of the actuators.

Therefore, it is an object of this invention to provide a simplified and improved fluid power system for a tractor.

Another object of this invention is to provide a fluid power system in which a pair of fluid operators are simultaneously and selectively operated or rendered inoperative through a simplified control system.

Another object of this invention is to provide in a fluid power system, an improved and simplified valve arrangement which will be operated through four control positions to control a pair of actuators associated therewith for simultaneous and selective operation as well as reversing operation of the same.

A further object of this invention is to provide in an improved fluid power system, a duel valve unit in which the valves are identical in construction and require only a single operating handle to provide for simultaneous and selective control of a pair of actuators connected thereto.

A still further object of this invention is to provide in a simplified and improved fluid power system applicable for the simultaneous and selective control of a pair of fluid actuators which is simple in design, economical to manufacture and is readily maintainable.

These and other objects of this invention will become apparent from a reading of the attached description together with the drawings wherein:

FIGURE 1 is a schematic diagram of the improved hydraulic or fluid circuit, and

FIGURES 2, 3, 4, and 5 are schematic diagrams of the control valves of the improved hydraulic or fluid system of FIGURE 1 shown in four operating positions for the same.

My improved fluid power system is shown herein as a hydraulic system for tractors. It shows schematically in FIGURE 1 an engine, indicated in block at 10, driving a pump 12 through a mechanical connection 13. Pump 12 is also shown schematically since it will be understood that the engine and pump are normally part of a tractor, the engine being the power plant of the tractor unit. Associated with the pump is a reservoir or sump 14 filled with a hydraulic fluid which is admitted to the pump through a supply pipe 16 connecting the reservoir with the pump. Pump 12 includes an outlet conduit or pipe 18 leading therefrom through which the fluid under pressure from the pump is transmitted to the devices to be operated. Similarly, fluid from these devices is returned to the reservoir through a return conduit or pipe 20 and connecting these conduits is a by-pass valve 22 of the pressure operated type which connects to the conduits 18 and 20 through conduits or pipes 21 in a conventional manner.

Associated with the pump and normally positioned on the tractor is a reversing valve, indicated generally at 25, having a four way valve body 26 with ports 27, 28, 29, and 30 therein. As shown in the schematic drawing, ports 27 and 28 are connected to the pipes 18 and 20 while the ports 29 and 30 are connected to the devices to be operated in a manner to be hereinafter described. The movable valve element of this reversing valve is indicated schematically at 31 having a pair of passages 32, 34 therein. The valve ports and the passages in the valve body provide a conventional four way valve configuration in which the connections through the valve from the supply and return pipes 18 and 20 are reversed with respect to the outlet ports 29 and 30 of the reversing valve. FIGURE 1 shows a version of this valve in schematic form in which the passages 32, 34 are shown solid for one valve position and dotted for a second valve position to indicate that flow is reversible between the outlet ports.

This portion of the schematic diagram basically relates to existing equipment found on conventional tractors which is designed to operate auxiliary hydraulic equipment. The schematic disclosure of the valve 25, pump 12 and engine 10 is provided for simplicity only in that it will be recognized that varying types of pumps and valves may be utilized for this purpose. The output ports 29 and 30 in the conventional tractor have normally associated therewith, supply conduit pipes 36, 38 which may be flexible and normally adapted to be connected to a single hydraulic actuator or device to be operated by the hydraulic power system of the tractor. In addition, there is normally included with the tractor, an operating handle or lever 37 which is mechanically connected to the movable element of the reversing valve as indicated by the dotted line 39 for operation of the reversing valve.

In the improved hydraulic power system, this power source has connected thereto an auxiliary control system which is comprised basically of a hydraulic control formed by a pair of control valves, indicated at 41 and 42 respectively. Flow through the supply conduits 36, 38 to these control valves will normally be in opposite directions, such that one of the pipes will represent the supply and the other the return passage to the hydraulic source. This function may be interchanged, however, by operation of the reversing valve 25, as will be hereinafter identified. The control valves 41 and 42 of the hydraulic control are identical in construction and are shown schematically in the drawings as comprising cylindrical valve bodies 43, 44 respectively. These valve bodies have three ports therein identified at 45, 46, 47, and 48, 49, 50 respectively. These ports are so located in the cylindrical valve bodies to be 90° displaced from one another. One of the ports of each of the valve bodies will normally be designated as the common port with the remaining ports being designated as the actuator ports from a control standpoint. Thus, as is shown in the drawings, the common ports 45 and 48 connect respectively to the supply pipes 36, 38 from the hydraulic source. The ports 46, 47 and 49, 50, or the actuator ports of the valves 41, 42 connect, as will be hereinafter noted, to the devices to be actuated by the hydraulic system. These control valves include rotatable valve elements 59, 60 which are cylindrical in form and fit within the cylindrical bodies 43, 44 respectively. The movable or rotatable valve elements 59, 60 have a plurality of passages therein which are physically positioned to align with the ports in the valve bodies for one operating position of the valve. Thus, as will be seen in the schematic drawing, the movable valve element 59 of valve 41 has passages 65, 66, and 67 therein which are connected in common and the valve element 60 of valve 42 has passages 68, 69 and 70 therein connected in common. The form of these valves are somewhat similar to a conventional three way valve except that in one operating position, all three ports will be connected. As will be later noted, the valve elements 59 and 60 will be rotated within the valve bodies 43, 44 through 360° of rotation and will pass four operating positions or conditions in which two or more of the passages align with the respective valve ports.

The output or actuator ports of the control valves 41, 42 are connected respectively to a pair of actuators 81, 82 to direct the fluid pressure therein in a direction to control the actuator in a desired range or direction of movement. Thus for valve 41, the actuator ports 46, 47 are connected through pipes or conduits 71, 72 to common extremities 90, 92 of the actuators. The actuators 81, 82 are shown schematically as piston devices having cylinders 84, 88 positioned therein which pistons have actuating shafts 86, 89 extending to the cylinders to perform a working function. The opposite common extremities of the actuators 81, 82 have ports 91, 93 which are in turn connected through conductors or pipes 74, 75 to the actuator ports 49, 50 of the control valve 42. Thus, it will be seen that one of the control valves has its actuator ports connected to the same end of each of the actuators to cause movement of the operating shafts 86, 89 thereof in the same direction assuming fluid flow exists simultaneously in the pipes 71, 72. At the same time, the opposite extremities of the actuators 81, 82 will have the ports 91, 93 providing a return flow through the conduits or pipes 74, 75 to the opposite control valve. This will give a predetermined direction of movement of both of the actuators causing the shafts to move out of the confines of the cylinders. As will be hereinafter noted, the valve 41 may be adjusted to position in which one or the other of the conduits or pipes 71, 72 will be disconnected from the common port 45 so that one or the other of the actuators 81, 82 will be energized. In addition, the control valve 41 may assume a position in which the ports 46, 47 will be connected together but not to the common port 45, in which case the actuators will be disconnected from the supply or return source pipes as the case may be, to and from the hydraulic source. It will also be recognized that through the reversing action of valve 25, the conduits 71, 72 may be the return conduits to the source and the conduits 74, 75 may be the pressure conduits, in which case the operation of the actuators 81, 82 will be reversed from that previously stated. The same degree of selectivity of the respective actuators through positioning of the valve 42 through its various operating positions will connect or disconnect the respective conduits 74, 75 to the common port 48 leading to the reversing valve 25.

The various operating positions for the valves 41, 42 of the hydraulic control are shown diagrammatically in FIGURES 2 through 5. The remaining details of the hydraulic power system are omitted for simplicity, but it will be understood that the common ports and actuator ports of the respective valves will be connected in the manner shown in FIGURE 1 for each of these diagrams. Therefore, in considering the diagrammatic disclosure in the control valves 41, 42 in FIGURE 2, it will be seen that the movable elements 59, 60 and the passages therein, bear the same relationship to one another and to their respective ports in the valve bodies 43, 44 as shown schematically in FIGURE 1. In this position, the common port of the supply port 45 is connected through the valve body and passages therein 65, 66, 67 to the outlet ports 46, 47. Similarly, for valve 42, the common port 48 is connected through the passages 68, 69, 70 to the actuator ports 49, 50 in the valve body 44. The configuration for the control valves 41, 42 are basically that of cylindrical bodies and cylindrically shaped movable valve elements which are adapted to be rotated through 360° with the ports and passages of the valves being spaced from one another 90°. This positioning of the parts of the valves 41, 42 provides for control through the valves from the common port to each of the actuator ports 46, 47 and 49, 50 simultaneously.

The rotation of the valve elements 59 and 60 from the first position of operation, as shown in FIGURE 2, to the second position of operation, as shown in FIGURE 3, moves the valve elements 59, 60, 90° in a clockwise direction. In this position of operation, the passage 66 aligns with port 45 and the passage 67 aligns with port 46 in the valve 41, and similarly, the passage 69 aligns with the passage 48 and the passage 70 aligns with the passage 49 of valve 42 to provide a single path through the valves and isolating the actuator ports 47, 50 therein. This condition of operation provides selectively for actuation of one of the operators associated with the control valves and isolation of the other from the hydraulic source.

The diagrammatic disclosure of FIGURE 4 discloses the third operating position of the control valves 41, 42 in which the movable elements 59, 60 have been rotated an additional 90° from the location disclosed in FIGURE 3. In this position of operation, the passages 67 and 65 are aligned with the ports 47 and 45, respectively, for valve 41, and the passages 68, 70 are aligned with the ports 50, 48 for the valve 42 respectively. In this condition of operation, the actuator ports 47, 50 are connected to the common ports 45, 48 through the common connections within the valve elements 59, 60, and the actuator ports 46, 49 are isolated therefrom. This will isolate the actuator previously connected as shown in FIGURE 3 and will connect the actuator previously isolated in the disclosure of FIGURE 3 to the hydraulic source.

FIGURE 5 shows the fourth position of operation of the control valves 41, 42 in which the movable valve elements have been rotated an additional 90° with respect to the ports, and the passages 65, 66 align with ports 46, 47 respectively for valve 41 while the passages 68, 69 align with the ports 49, 50 respectively for the valve 42. In this condition of operation, the common ports 45, 48 are isolated, and the actuator ports 46, 47 and 49, 50 are connected in common. Thus, the actuators are disconnected from the source of fluid under pressure from the reversing valve 25 and will be inoperative.

The common rotation of the movable elements 59, 60 of the valves 41, 42 of the hydraulic control is provided by physically connecting the rotating elements or their actuating shafts together. This is shown diagrammatically in FIGURE 1 by the broken line mechanical connections 95, 96 which represent the operating shafts for the rotatng elements which are connected to a common connection 97, also shown as a dotted line, and to an actuating handle 100. The operating positions of this common connection are shown by the dotted arrows 98. In the diagrammatic disclosure of FIGURE 1, a combination of gears 102 is shown connecting the handle 100 with the common shaft 97 so that the handle 100 will not have to be rotated through 360° to provide a complete rotation of the common shaft 97 and a rotation of the valve elements 59, 60 of the valves 41, 42 through all of their operating positions. Associated with the handle 100 is a quadrant plate 102 having notches 104 therein which notches represent the four operating positions of the valves to serve as a guide for handle positioning to obtain the desired valve operation. In the improved hydraulic control system this arrangement would normally be mounted adjacent the reversing control or handle 37 of the reversing valve 25 which is connected to the reversing valve, as shown schematically by the dotted line 39. The reversing control, as indicated above, will have two main operating positions for reversing the flow of fluid from the hydraulic source and to the reservoir with an intermediate position in which the passages therefrom are blocked. Thus, FIGURE 1 shows schematically a similar plate 110 with notches 112 therein indicating these relative operating positions of the reversing valve.

While a single handle is shown schematically as a means for operating the hydraulic control, it will be recognized that this handle may be directly connected to the control valves and rotated through 360° to obtain the desired operation, or a plurality of handles connected together and spaced in quadrature from one another may be utilized directly on the valves for indicating the various operating positions. In addition, while I have shown piston type actuators 81, 82 associated with the hydraulic power system, it will be understood that any type of bi-directional hydraulic actuator may be utilized with this system. Thus for example, the actuators may be rotary in form, if desired, with directional inlet and outlet ports therein which will be designed to receive fluid under pressure for causing rotation of the device in one direction and returning the fluid to the source after it flows through the actuator. Such devices may be reversible by reversing the flow through the ports as in the case of the conventional piston type actuator.

In the operating position or condition of the hydraulic power system as shown in FIGURE 1, the reversing valve 25 is adjusted to supply fluid under pressure to the conduit 36 from the pump 18 while the return line 20 is connected through the conduit 38 to the control valve 42. In this condition of operation, both actuators 81 and 82 will be energized by the fluid flowing in the conduit 36 and through conduits 71, 72 from the control valve 89 out from the confines of the cylinders 84, 87. Return flow of the fluid already within the actuators at the op- 41 to move the actuators or their respective shafts 86, posite ends thereof will be directed through the conduits 74, 75 and the valve 42 to the conduit 38 and through the reversing valve to the return pipe 20 and the reservoir 14. Both actuators will be operated to their extreme position. The actuators 81, 82 will remain in this position and fluid under pressure from the pump 12 will be directed through the bypass valve 22 to prevent injury to the actuators and valve parts as long as this control position is maintained. The actuators may be controlled in direction by reversing the valve 25 which will reverse the flow from the source and cause the opposite end of the actuators to be energized and providing the return passage for the fluid in the actuators through the valve 41 and conduit 36. Selective operation of one or the other of the actuators can be obtained by rotating the hydraulic control handle to shift the elements of valves 41, 42 through either 90 or 180° to the second or third valve positions. As shown in FIGURES 3 and 4, these operating positions will provide for passage of the fluid from the conduit 36 through the valve 41 to one or the other of the actuator ports 46, 47 and conduits or pipes 71, 72 to one or the other of the actuators 81, 82. The return line will be established by the similar position of the valve 42 such that only one of the actuators 81, 82 will be connected at its opposite extremity to the return passage or pipe 38 leading to the reservoir 14 through the reversing valve 25. The fourth operating position of the control valves is obtained by rotating the control valves 41, 42 to the position shown in FIGURE 5 at which point the common ports 48, 49 will be isolated from the actuators and regardless of the position of the reversing valve 25, no fluid will be supplied to or returned from the hydraulic control such that the actuators 81, 82 will be inoperative. This will provide an arrangement which will be very simply controlled to isolate one or the other of the actuators auxiliary to the operation of the tractor and normally included in the implements associated therewith. Similarly, these actuators may be interchanged as far as energization from the hydraulic source is concerned or may be isolated from the hydraulic source, if such a condition is desired. Reversing of the actuator in any of the desired valve positions except for the fourth position will be obtained merely by operating the reversing valve which will reposition the supply conduits 36, 38 with respect to the pump and the reservoir to reverse the direction of flow therein.

It will therefore be seen that I have provided a very simple hydraulic or fluid control circuit that requires a minimum of parts and provides for simultaneous and selective operation of a pair of auxiliary hydraulic actuators with the conventional hydraulic source normally included on a tractor. The various forms of the actuators and the control handles may be modified within the scope of the invention as well as the particular configuration of the control valves within the scope of the invention. Therefore, in considering the invention, it should be remembered that the present disclosure is intended to be illustrative only and the scope of the invention should be determined by the appended claims.

What is claimed is:

1. A fluid power system comprising, a fluid source, a reservoir of fluid connected to said fluid source, outlet conduit means connected to said fluid source for transmitting fluid under pressure therefrom, a return conduit means connected to said reservoir, pressure responsive bypass valve means connected between said outlet conduit means and said return conduit means, a four way reversing valve connected to said outlet and return conduit means and including a pair of conduits leading therefrom, a pair of control valves for controlling flow to and from said reversing valve, each of said control valves having a valve body with three valve ports therein, a rotatable valve element for each of said valves having three passages therein connected in common, each of said control valves having four operating positions, one of which connects the ports in the valve body to the common three way passage in the rotatable valve element, the remaining positions of operation of said valve means being obtained by positioning of the rotatable valve element relative to the valve body such that the valve ports are connected through the passages in the rotatable valve element in pairs with each of the pairs being different from one another, means connecting the rotatable valve elements of each of the control valves such that the valve elements bear the same relationship to the ports in the valve bodies and are moved together relative to the ports at all times, conduit means connecting a first of the ports in the valve bodies respectively to the pair of supply conduits, a pair of two way acting cylindrical piston devices to be operated by the fluid power system, conduit means connecting the remaining ports of one of said control valves to a common end of the cylindrical piston devices, and additional conduit means connecting the remaining ports of the other control valve to the opposite common end of the cylindrical piston devices.

2. A fluid power system comprising, a fluid source, a reservoir of fluid connected to said fluid source, outlet conduit means connected to said fluid source for transmitting said fluid under presssure therefrom, a return conduit means connected to said reservoir, pressure responsive bypass valve means connected between said outlet conduit and said return conduit, a four way reversing valve connected to said outlet and return conduit means and including a pair of conduits leading therefrom, a pair of two way acting cylindrical piston devices each having fluid connecting means at the extremities thereof for supplying fluid to said piston devices to control the direction of movement of said piston devices, a pair of control valves for controlling the flow of the fluid under pressure to and from said reversing valve, said control valves being adapted to control flow of the fluid under pressure to and from the extremities of said cylindrical piston devices to control the operation of the same, each of said control valves having a common port and a pair of actuator ports with movable valve elements therein movable between four operating positions in which the common port is connected to both actuator ports and selectively to the actuator ports and in a fourth position in which the common port is disconnected from the common connected actuator ports, conduit means connecting the common ports of said valves to said conduits of said reversing valve, additional conduit means connecting respectively the actuator ports of one of the control valves to the same extremities of the pair of cylindrical piston devices and the actuator ports of the other of the control valves to the opposite extremities of the cylindrical piston devices, and means connecting the movable elements of said control valves for simultaneous movement through the four operating positions of said valves to simultaneously and selectively control the operation of said cylindrical piston devices.

3. The fluid power system of claim 2 in which the pair of control valves each have a cylindrical body with ports therein spaced 90° from one another and the movable valve element has passages therein spaced 90° to one another and connected in common with the movable valve element being rotatable through 360° of rotation and the operating positions of the control valves being obtained when at least two of the passages align with at least two of the ports in the valve body.

4. A fluid power system comprising, a source of fluid under pressure including a pressure conduit and a return conduit, a pair of fluid actuators to be powered by said fluid source, said actuators each having a pair of directional control inlet and outlet ports associated therewith, a pair of control valves for controlling flow to and from the fluid source, each of said control valves having a valve body which includes a common port and a pair of actuator ports with the common port of each valve being adapted to be connected selectively to the conduits of said fluid source, a movable valve element in each of said control valves having operating positions adapted to connect the common port to both actuator ports and selectively to each of the actuator ports and in addition to connect the actuator ports in common but isolated from the common port, conduit means connecting the actuator ports of one of the control valves to the same directional control ports of the pair of fluid actuators and the actuator ports of the other of said control valves to the remaining directional control ports of the pair of fluid actuators, and means connected to the movable elements of both of said control valves for simultaneously operating each of the control valves through the same operating positions to operate the fluid actuators simultaneously and selectively and to isolate both actuators.

5. The fluid power system of claim 4 and including means connected to the source of fluid pressure for reversing the flow of the fluid through said pressure and return conduits.

6. The fluid power system of claim 4 in which the movable elements of the control valves have passages therein normally aligned with the common and actuator ports which passages are connected in common and in which the movable valve elements of the control valves are physically connected to an operating means for rotation thereby through the operating positions in which at least two of the passages in the movable valve elements align with the ports in the valve body and the valve elements bear the same relationship to the valve body at all times.

7. The fluid power system of claim 5 in which the control valves have cylindrical valve bodies and the common and actuator ports are spaced 90° thereon with the valve elements having passage there in spaced 90° apart and connected in common, and with the valve elements being adapted to be rotated through 360° to obtain valve operating positions in which at least two of the passages align with the valve ports.

8. The fluid power system of claim 7 in which the fluid actuators are piston devices with fluid ports at the extremities of the same for supplying fluid to the devices to control the movement of the piston in two directions, and in which the means for reversing the flow of fluid under pressure from the source is a reversing valve connected between the source and the pressure and return conduits to interchange the same.

References Cited by the Examiner
UNITED STATES PATENTS

| | | | |
|---|---|---|---|
| 2,853,102 | 9/1958 | Walker | 91—413 |
| 2,912,131 | 11/1959 | Jung et al. | 91—413 |
| 3,043,328 | 7/1962 | Taylor | 91—413 |
| 3,061,380 | 10/1962 | Hale | 91—413 |

SAMUEL LEVINE, *Primary Examiner.*